US006275766B1

(12) United States Patent
Zhang et al.

(10) Patent No.: US 6,275,766 B1
(45) Date of Patent: Aug. 14, 2001

(54) SYSTEM AND METHOD OF REDUCING CHRONOMETRIC LOAD

(75) Inventors: Xiaoying Zhang, Dearborn Hts.; Jeffrey Raymond Mohr, Shelby Township, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/468,498

(22) Filed: Dec. 21, 1999

(51) Int. Cl.[7] .............................. B60K 41/00; G06F 9/46

(52) U.S. Cl. .......................... 701/110; 701/114; 701/115; 701/102; 73/117.3

(58) Field of Search .................................... 701/110, 101, 701/102, 114, 115; 73/116, 117.3; 123/406.23

(56) References Cited

U.S. PATENT DOCUMENTS

| | | | | |
|---|---|---|---|---|
| 4,414,946 | * | 11/1983 | Daumer et al. | 123/417 |
| 4,551,803 | * | 11/1985 | Hosaka et al. | 701/105 |
| 4,562,728 | * | 1/1986 | Timmerman | 73/116 |
| 4,595,986 | * | 6/1986 | Daubenspeck et al. | 342/373 |
| 5,445,127 | | 8/1995 | Cullen et al. . | |
| 5,526,794 | | 6/1996 | Messih et al. . | |
| 5,878,366 | * | 3/1999 | Schricker et al. | 701/101 |
| 5,951,619 | * | 9/1999 | Merl et al. | 701/115 |
| 6,144,913 | * | 11/2000 | Braun et al. | 701/102 |

* cited by examiner

*Primary Examiner*—Henry C. Yuen
*Assistant Examiner*—Hieu T. Vo
(74) *Attorney, Agent, or Firm*—Jerome R. Drouillard

(57) ABSTRACT

A system and method of improving the control quality of a vehicle engine having a rotatable and positionable crankshaft by prioritizing tasks to be performed by a microprocessor preprogrammed with an inventory of foreground and background engine tasks affecting the efficiency and performance of the vehicle. The invention includes sensing the speed of rotation of the crankshaft to provide a first, second, or third signal indicative of respective low, medium, or high crankshaft speeds, sensing the position of the crankshaft to provide a fourth signal of the crankshaft position, and processing these signals. The foreground tasks are selected if the fourth signal is received. A first set of the foreground tasks are selected if the first signal is received. A second set of the foreground tasks are selected if the second signal is received. A third set of the foreground tasks are selected if the third signal is received.

17 Claims, 3 Drawing Sheets

SYSTEM AND METHOD OF REDUCING CHRONOMETRIC LOAD

TECHNICAL FIELD

The present invention relates to a system and method of improving the control quality of a vehicle engine having a rotatable and positionable crankshaft by prioritizing tasks to be performed by a microprocessor preprogrammed with an inventory of foreground and background engine tasks affecting the efficiency and performance of the vehicle.

BACKGROUND ART

Vehicle engines are continuously designed with more accuracy and precision as the demand for higher efficiency and performance in vehicles increase. The accuracy and precision in engines and transmissions may be indicative of the number of parameters controlled by a vehicle's powertrain control module. Typically, the control module regulates and feeds data to engine and transmission systems of the vehicle. The operation of the control module affects some systems within the vehicle which, in turn, affects the overall efficiency and performance of the vehicle. As more engine parameters are controlled by the control module, the more engine related calculations and functions are required in order to run the vehicle in accordance with its design specifications. For example, a parameter may include determining the optimum engine air charge which involves gathering data and performing air charge calculations to establish the vehicle design specification.

The control module typically employs an operating system which is programmed to execute at least two levels of tasks, high priority and low priority tasks, based on engine speed or time. High priority tasks may be referred to as foreground tasks, and low priority tasks may be referred to as background tasks. A set of foreground tasks are executed during separate periods called foreground periods. A foreground period is a period during which the execution of a set of foreground tasks are begun and completed. Thus, the execution of a set of foreground tasks start and end during one foreground period. During a foreground period, background tasks are executed once the execution of the respective set of foreground tasks are completed.

Generally, background tasks are continuously and repeatedly executed by the control module until a piston event triggers the foreground tasks to be executed. Thus, a piston event may define the end of a previous foreground period and the beginning of a following foreground period. A cylinder or piston event may occur during one cycle of each of the pistons of the engine, such as ignition or intake. Tasks with lower priority are executed only when foreground tasks have been completed. A task may be a preprogrammed command strategy which, when accessed from memory, directs the control module to perform specific functions and subroutines in order to operate the engine at design specifications.

As engine speeds increase, piston events take place more frequently which, in turn, demand more frequent foreground tasks to be executed. The more frequently foreground tasks are executed, the more chronometric load is placed on the operating system of the control module. Chronometric load may be the measure of resources used within a control module. Thus, at increased engine speeds, more resources of the control module are used to execute high priority (or foreground) tasks and less resources are used to execute low priority (or background) tasks than at lower engine speeds. Consequently, the elapsed time between the execution of background tasks are progressively longer as engines are operated at higher speeds. Additionally, the more cylinders one engine has leads to more foreground calculations the control module employs, resulting in more severe chronometric impacts experienced.

The decrease of resources used to execute lower priority tasks at higher engine speeds may provide some systems within the vehicle to experience adverse effects. For example, transmission shifting quality of some vehicles may be lowered. The combination of (1) more frequently occurring piston events per increased engine speed, and (2) increased foreground calculations at increased engine speeds results in a relatively long background calculation time. As a result, low or fair transmission shifting quality may be experienced.

Thus, what is needed is an improvement to the operation of powertrain control modules. Particularly, an improvement is needed in reducing the chronometric load of the operating system of the control module.

Also, what is needed is a system and method for reducing the foreground tasks executed at higher speeds and reducing the rate at which the foreground tasks are executed in order to reduce the chronometric load of the control module.

DISCLOSURE OF THE INVENTION

Accordingly, it is an object of the present invention to provide an improved system and a method of improving the control quality of a vehicle engine having a rotatable crankshaft by preselecting certain foreground engine tasks to be performed by a microprocessor preprogrammed for such foreground engine tasks.

It is a further object of the present invention to provide an improved system and method of improving the control quality of a vehicle engine in order to reduce a chronometric load of an operating system of a powertrain control module.

A more specific object of this invention is a method of improving the control quality of a vehicle engine having a rotatable and positionable crankshaft by prioritizing tasks to be performed by a microprocessor preprogrammed with an inventory of foreground and background engine tasks affecting the efficiency and performance of the vehicle. The method involves sensing the speed of the crankshaft to provide a first, second, or third signal of respective low, medium, and high crankshaft speeds. The method further includes sensing the position of the crankshaft to provide a fourth signal of the crankshaft position. If the signal received indicates the crankshaft is at a predetermined position, then the method includes processing the signals to select the foreground tasks for execution. If the signal received is low crankshaft speed, then the method includes processing the signals to select a first set of the foreground tasks for execution in a first manner. If the signal received is medium crankshaft speed, then the method includes processing the signals to select a second set of the foreground tasks for execution in a second manner. If the signal received is high crankshaft speed, then the method includes processing the signals to select a third set of the foreground tasks for execution in a third manner.

Another specific object of this invention is a system for improving the control quality of a vehicle engine having a rotatable and positionable crankshaft by prioritizing tasks to be performed by a microprocessor preprogrammed with an inventory of foreground and background engine tasks affecting the efficiency and performance of the vehicle. The system includes a first mechanism for sensing the speed of the crankshaft to provide a first, second, or third signal of respective low, medium, and high crankshaft speeds. The system further includes a second mechanism for sensing the position of the crankshaft to provide a fourth signal of the crankshaft position. The system further includes a third mechanism for processing the signals. If the signal received indicates the crankshaft is at a predetermined position, then the third mechanism processes the signals to select the foreground tasks for execution. If the signal received is low crankshaft speed, then the third mechanism processes the signals to select a first set of the foreground tasks for execution in a first manner. If the signal received is medium crankshaft speed, then the third mechanism processes these signals to select a second set of the foreground tasks for execution in a second manner. If the signal received is high crankshaft speed, then the third mechanism processes the signals to select a third set of the foreground tasks for execution in a third manner.

BEST MODES FOR CARRYING OUT THE INVENTION

Figure 1:
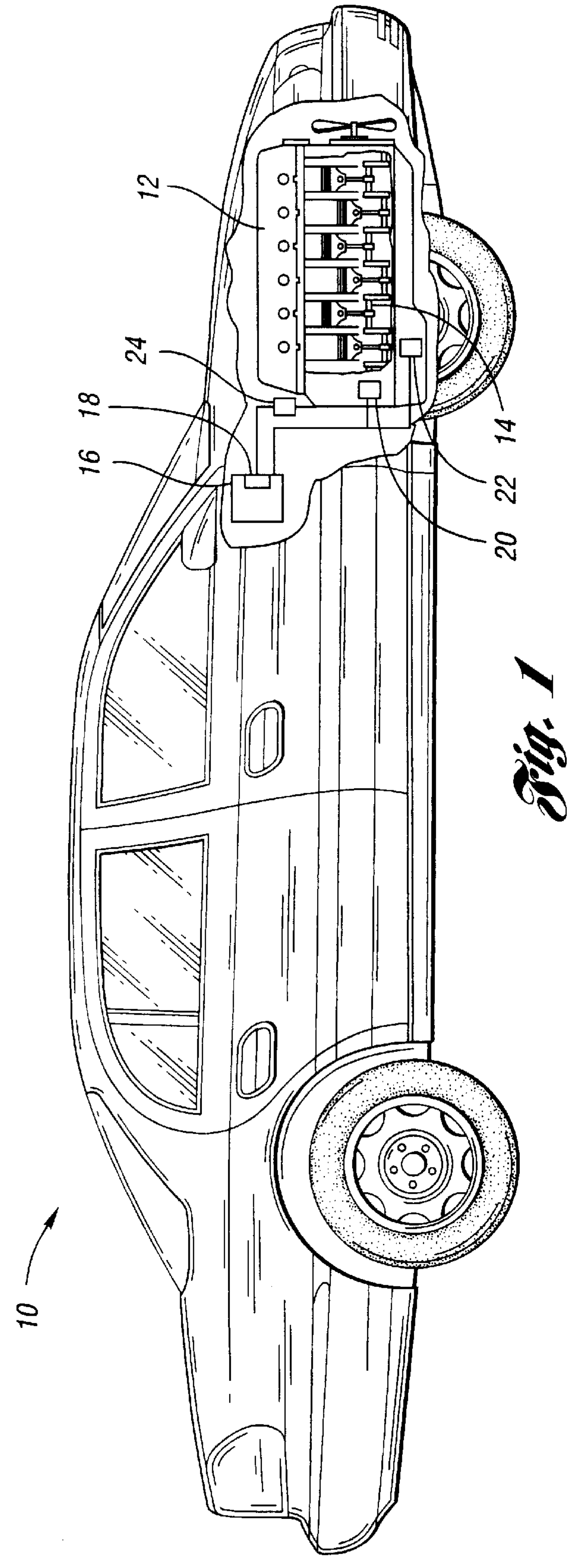
FIG. 1 is a schematic of vehicle illustrating the overall system in accordance with one embodiment of the present invention.

FIG. 1 schematically illustrates a system 10 for improving the control quality of a vehicle engine 12 having a rotatable and positionable crankshaft or driveshaft 14 by prioritizing tasks to be performed affecting the efficiency and performance of the vehicle. System 10 includes a control module 16 having a microprocessor 18, a speed sensor 20, a crankshaft position sensor 22, and a feature system 24. As shown in FIG. 1, speed sensor 20 and position sensor 22 are in communication with control module 16. Control module 16 is in communication with feature system 24.

Speed sensor 20 provides a mechanism for selectively sensing the speed of crankshaft 14 relative to the speed of engine 12 to provide a first, second, or third signal of respective low, medium, and high crankshaft speeds. Speed sensor 20 may be any type of suitable sensor which may sense crankshaft or engine speeds and provide a signal indicative of such speeds. For example, sensor 20 may be a variable reluctance sensor (VRS).

Position sensor 22 provides a mechanism for sensing the position of crankshaft 14 relative to a piston event within the engine to provide a fourth signal of the crankshaft position. Sensor 22 may be any type of suitable sensor which may sense crankshaft position and provide a signal indicative of such position. For example, sensor 22 may be a VRS or, more specifically, a crankshaft position sensor (CPS). Also, sensor 22 may provide the fourth signal which may be processed to determine first, second, or third signals indicative of engine speed. In such case, sensor 20 may not be needed.

Control module 16 includes a microprocessor 18 which provides a mechanism for processing the signals to select a set of the foreground tasks based on the position of crankshaft 14 for execution in a manner based on the speed of crankshaft 14. Control module 16 may be any type of suitable control module, such as a powertrain control module (PCM), for example, with a base part number of "-12A650-" referenced under Ford Motor Company. Microprocessor 18 may be any type of suitable microprocessor which may process the signals, select a set of foreground tasks based on crankshaft position, and execute the set of tasks in a manner based on crankshaft speed. Thus, microprocessor 18 may be of any suitable type which allows it to perform functions as described. For example, microprocessors used in a PCM may be used.

Microprocessor 18 may also send input signals to feature system 24, providing control and/or data signals thereto to maintain vehicle design specifications. For example, feature system 24 may be the transmission system of the vehicle which receives control and data signals relative to engine speed and piston events.

Sensors 20,22 may be in communication with control module 16 by any suitable means such as by wire harness, radio frequency (RF), etc Likewise, module 16 may be in communication with feature system by such means, also.

Figure 2:
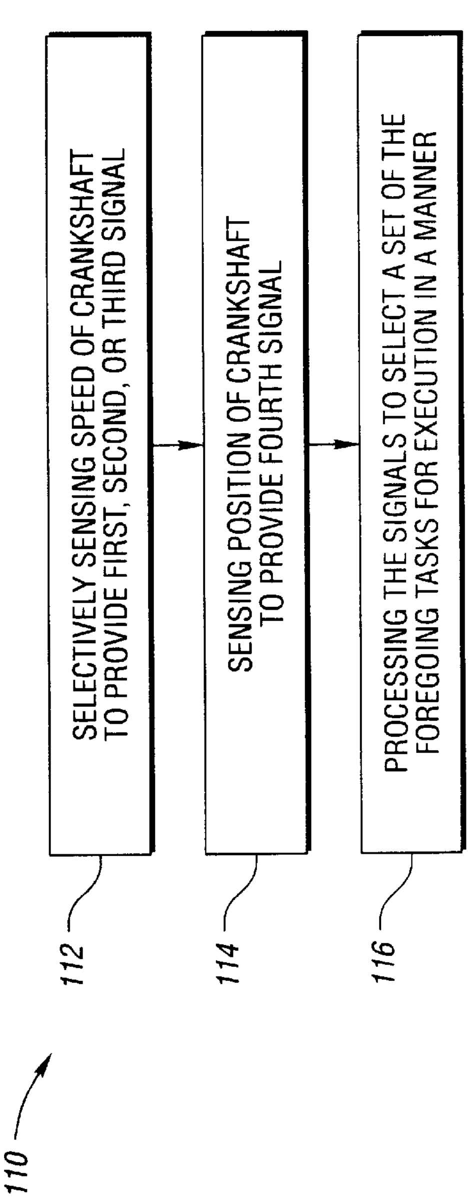
FIG. 2 is a flowchart illustrating one method of the inspection provided by the present invention in accordance with the system of FIG. 1.

FIG. 2 illustrates a general method of the present invention in accordance with system 10 of FIG. 1. The method as generally shown in reference 110 of FIG. 2 includes selectively sensing the speed of crankshaft 14 to provide a first, second, or third signal of respective low, medium, and high crankshaft speeds in 112 and sensing the position of crankshaft 14 to provide a fourth signal in 114. The method further includes processing the signals to select a set of tasks for execution in a manner based on crankshaft speed in 116.

Figure 3:
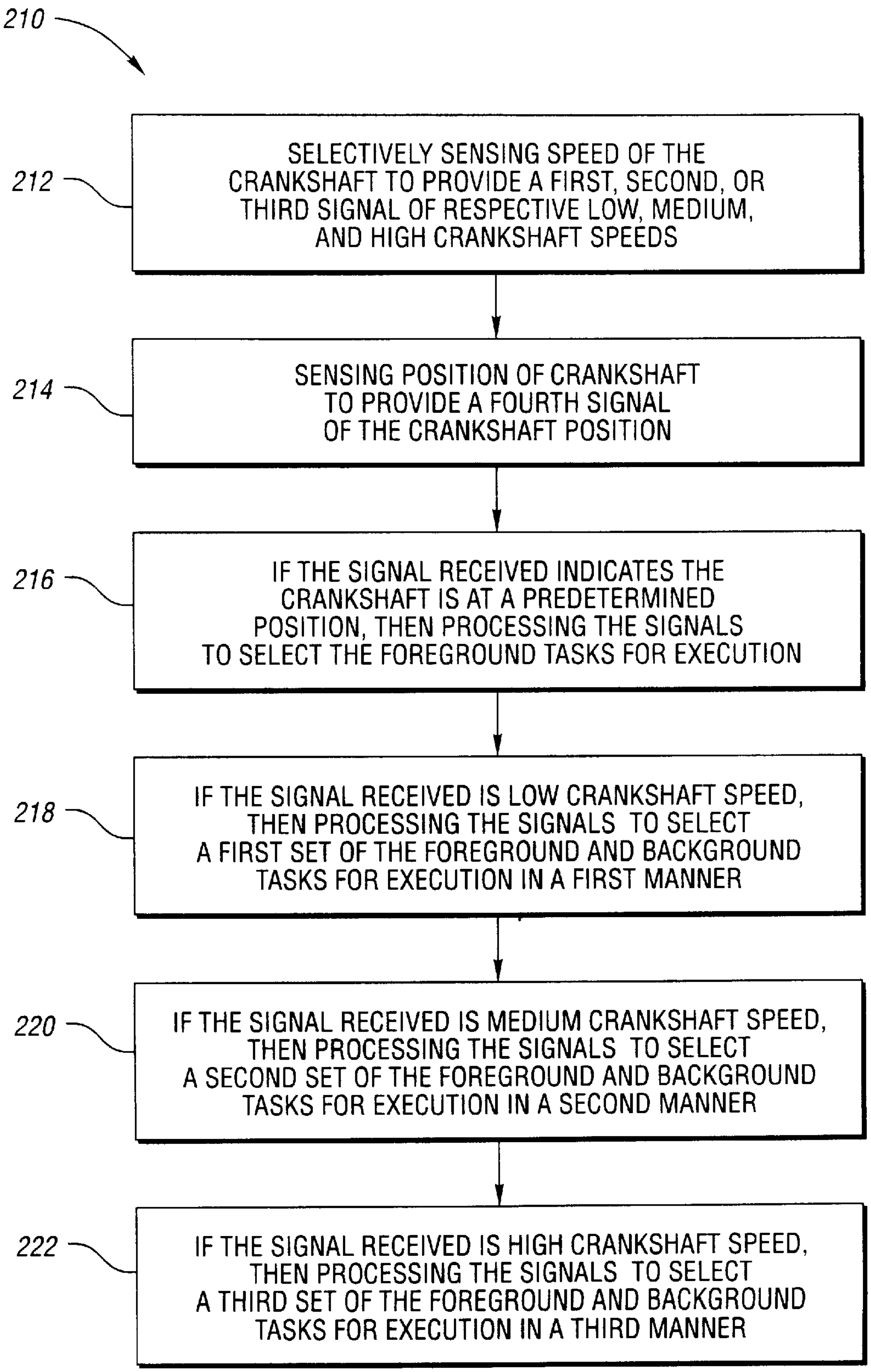
FIG. 3 is another flowchart illustrating another method of the present invention in furtherance of the method of FIG. 2.

As shown, FIG. 3 illustrates an example of the general method of FIG. 2. In this embodiment, control module 16 has microprocessor 18 which processes signals from speed sensor 20 and position sensor 22, and sends control/data signals to feature system 24.

Speed sensor 20 selectively senses the speed of crankshaft 14 relative to the speed of engine 12. Sensor 20 then sends a signal indicative of engine speed to microprocessor 18. The signal sent by sensor 20 may be identified as first, second, or third signals which represent different ranges of engine speeds, low, medium, and high speeds, respectively. Thus, depending on the engine speed at the time which sensor 20 senses, one of the three signals is sent.

For example, the first signal may represent low speeds or 0–3500 revolutions per minute (rpm), the second signal may represent medium speeds or 3501–4200 rpm, and the third signal may represent high speeds or 4201 rpm and higher. However, different speeds used do not fall beyond the scope or spirit of this invention. The signals may be any type of signals which are different and distinguishable by microprocessor 18 such as frequency signals, radio frequency signals, etc.

Figure 4:
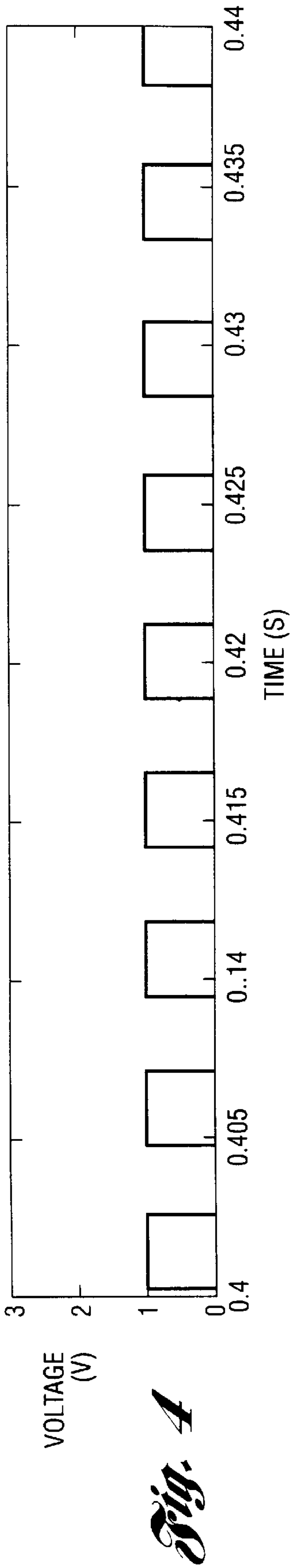
FIG. 4 is a voltage change graph illustrating indications of piston events within the engine of the system depicted in FIG. 1.

Position sensor 22 senses a relative crankshaft position, which is indicative of a piston event, to provide a fourth signal to microprocessor 18. The position of crankshaft 14 provides information, for instance, as to the degrees before top dead center of a cylinder of engine 12. For example, within a four stroke engine having six cylinders, crankshaft 14 may rotate 720 degrees per cycle and 120 degrees per piston. Thus, depending upon the relative position of rotation of crankshaft 14, the degrees before top dead center of a piston of engine 12 may be determined, and the fourth signal may be provided to microprocessor 18. Sensor 22 may provide a different signal as the fourth signal at specific positions of crankshaft 14, indicating a targeted piston event, e.g., 10 degrees before top dead center. Sensor 22 may provide the fourth signal to microprocessor 18 by any suitable means, such as frequency, radio frequency, voltage change, etc. Preferably, sensor 22 provides voltage change signals in pulses, e.g., square waves. As shown in FIG. 4, the beginning or end of a transition in voltage may indicate the targeted piston event, e.g., 10 degrees before top dead center.

Sensor 20 may be disposed near crankshaft 14 in order to sense engine speed. Sensor 22 may be disposed near crankshaft 14 in order to sense position of crankshaft relative to a piston event.

Microprocessor 18 processes the first, second, or third signal from sensor 20 and the fourth signal from sensor 22. Alternatively, as mentioned above, sensor 22 may provide the fourth signal which may be processed by microprocessor 18 to determine the first, second, or third signal indicative of engine speed. As mentioned above, control module 16 continually and repeatedly executes background (low priority) task until foreground (high priority) tasks are to be executed. The execution of tasks may be dependent on the signals provided by sensors 20,22. That is, determining when foreground and background tasks may be executed and in what manner may be based on the speed of engine 12 and position of crankshaft 14.

More specifically, microprocessor 18 processes the fourth signal to select the foreground tasks for execution, if the fourth signal indicates that the crankshaft is at a predetermined rotational position. In other words, foreground (high priority) tasks may be executed depending on the position of crankshaft 14 indicated by the fourth signal. The fourth signal is provided preferably by a voltage change such as a square wave, representing a predetermined rotational position of cams (not shown) which turn crankshaft 14 or simply a predetermined rotational position of crankshaft 14. The predetermined rotational position, in turn, may represent a piston event. Such event may be an activation point calling for some calculations or functions to be made and the execution of foreground tasks to be started by microprocessor 18.

For example, every relative 120-degree position of crankshaft rotation may represent 10 degrees before top dead center for one of each piston within engine 12. Each 120-degree position may be represented by the beginning or end of a voltage change such as a square wave, as shown in FIG. 4. In this embodiment, when the voltage change occurs in FIG. 4, i.e., when the fourth signal indicates a voltage change, microprocessor 18 halts all background tasks and initiates execution of the foreground tasks. Preferably, tasks are prestored in the memory of microprocessor 18 and are accessed therefrom. Microprocessor 18 processes the first, second, or third signal provided by sensor 20. Microprocessor then selects a first set of the foreground tasks for execution in a first manner, if the first signal is provided. As stated above, the first signal may be indicative of low speeds of engine 12 or crankshaft 14. Low engine speeds may include a range of 0–3500 rpm. In this embodiment, the first set of foreground tasks may be a full list of a number of tasks which are prestored in the memory and accessible therefrom. The first manner may be a rate at which the list of foreground tasks may be executed, e.g., at every piston event.

Microprocessor 18 selects a second set of the foreground tasks for execution in a second manner, if the second signal is provided. As stated above, the second signal may be indicative of medium speeds of engine 12 or crankshaft 14. Medium engine speeds may include a range of 3501–4200 rpm. It has been found that, during medium engine speeds, certain foreground tasks need not be executed at every piston event in order to operate the vehicle at design specifications. That is, at medium engine speeds, some parameters, otherwise monitored and/or calculated by microprocessor 18, do not substantially affect the control quality of vehicle systems and need not be calculated at every piston event.

For example, air charge tasks rate do not substantially affect the control quality of vehicle systems at medium and high engine speeds. Air charge tasks contribute to the chronometric load experienced by control module 16 in order to direct microprocessor 18 to execute respective subroutines. However, foregoing the execution of these tasks at a predetermined rate during medium and high engine speeds does not substantially affect vehicle systems and reduces the chronometric load.

In this embodiment, the second set of foreground tasks may exclude the execution of some tasks which are normally executed in the first set, e.g., air charge tasks. Thus, the number of tasks within the second set may be a percentage of the first set of foreground tasks. For example, the second set may selectively have 80% of the tasks of the first set, effectively eliminating 20% of the tasks. The tasks of the second set are predetermined so as to not eliminate certain tasks needed for execution during medium engine speeds.

Figure 5A:
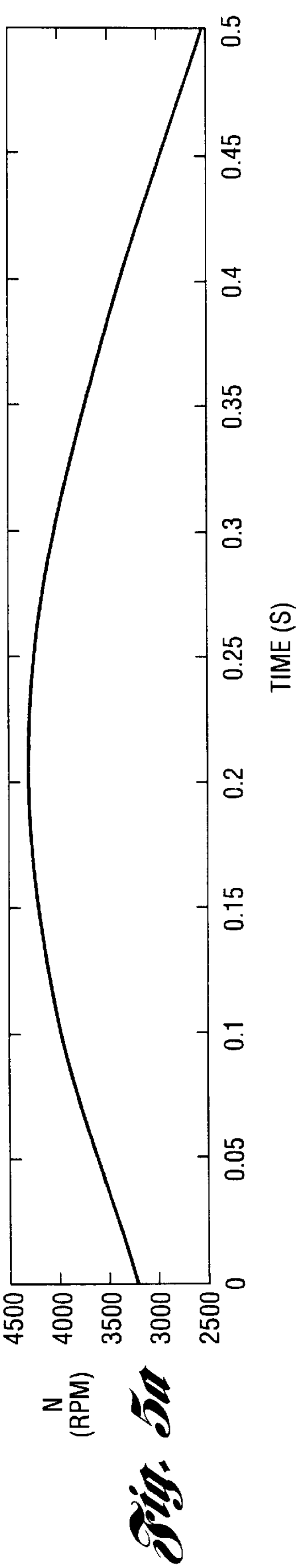
FIG. 5*a* is an engine speed graph to be viewed in conjunction with FIG. 5*b* (below)
Figure 5B:
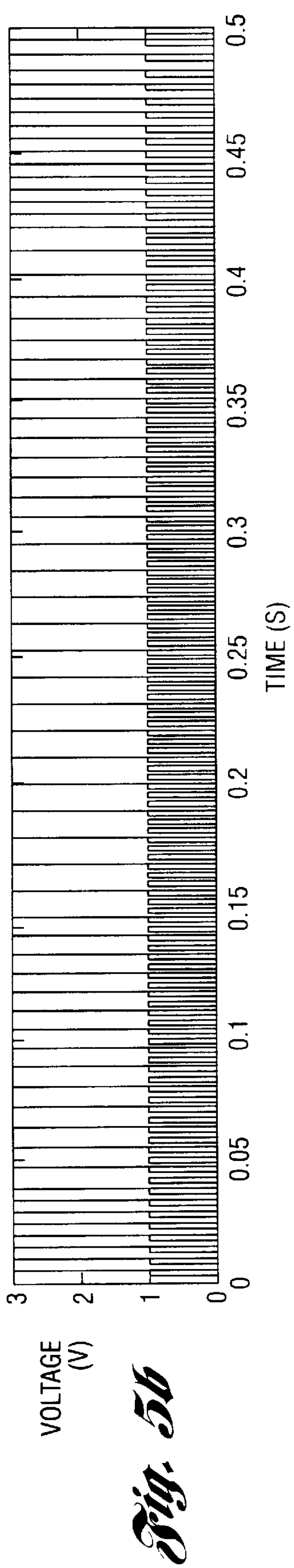
FIG. 5*b* is a voltage graph illustrating Aone embodiment of the present invention of executing foreground tasks.

Because it has been found that certain foreground tasks need not be executed at every foreground period in order to operate the vehicle at design specifications during medium engine speeds, the second manner at which the second set is executed may be at a rate slower than the rate of the first manner, e.g., alternate piston events. Thus, in this embodiment, at medium engine speeds, the second set of foreground tasks may be executed at every other foreground period as shown in FIGS. 5*a* and 5*b*. As shown in FIGS. 5*a* and 5*b*, the first set may be executed at the respective alternating foreground periods at medium engine speeds.

In this embodiment, certain tasks of the second and third sets may be configured so as to be executed substantially synchronously. Certain tasks may direct microprocessor 18 to subroutines partially or wholly dependent on results of other subroutines. Typically such dependency includes dependency on time or engine speed. Thus, the more synchronous such tasks are executed, the more accurate the execution thereof which, in turn, affects the control quality of the vehicle engine. For example, fuel charge tasks are at least partially dependent on air charge tasks. A substantially synchronous execution of these tasks provides better engine control quality.

Additionally, as air charge tasks may be eliminated in the second set and third set (described below), so may fuel charge tasks, in synchronism. Because of the dependency on air charge tasks, fuel charge tasks may not aid in control quality when air charge tasks are eliminated and may also be synchronously eliminated at certain rates during medium and high engine speeds. In one embodiment, air charge tasks and fuel charge tasks may make up the eliminated 20% of tasks in the second set.

Microprocessor 18 then selects a third set of the foreground tasks for execution in a third manner, if the third signal is provided. As stated above, the third signal may be indicative of high speeds of engine 12 or crankshaft 14. It has also been found that, during high engine speeds, certain foreground tasks need not be executed at every foreground period in order to operate the vehicle at design specifications. That is, at high engine speeds, some tasks, such as air and fuel charge tasks, do not substantially affect the control quality of vehicle systems, and need not be calculated at every or every other foreground period.

In this embodiment, the third set, like the second set, of foreground tasks may exclude the execution of some tasks which are normally executed in the first set. Thus, the third set may be a percentage of the first set of foreground tasks. For example, the third set may have the identical tasks as the second set, 80% of the tasks of the first set. Like the second set, the tasks of the third set are predetermined so as to not eliminate certain tasks needed for execution during high engine speeds.

Because it has been found that certain foreground tasks need not be executed at every or every other foreground period in order to operate the vehicle at design specifications during high engine speeds, the third manner at which the third set is executed, may be at a rate slower than the rate of the second manner, for example, every third foreground period. Thus, in this embodiment, at high speeds, the third set of foreground tasks may be executed at every third foreground period as shown in FIGS. 5*a* and 5*b*. As shown in FIGS. 5*a* and 5*b*, the first set may be executed at the respective remaining two foreground periods.

Microprocessor 18 may include a lagging in the execution of tasks. In this embodiment, low, medium, and high engine speeds are in the ranges of 0–3500 rpm, 3501–4200 rpm, and 4201 rpm and greater, respectively. Thus, potentially continual low-to-medium and medium-to-high engine speed transitions may cause the system to execute at fluctuating manners, i.e., between the first and second manner or between the second and third manner. This operation is undesirable. To avoid such operation, a hysteresis may be set for decreasing engine speeds. For example, decreasing engine speed thresholds may be set at 4000 rpm and 3200 rpm for high-to-medium and medium-to-low engine speed transitions, respectively. Thus, when engine speeds fluctuate between the ranges, rates at which tasks are executed do not fluctuate. Rather, a more stable operation is experienced.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of improving the control quality of a vehicle engine having a rotatable and positionable crankshaft by prioritizing tasks to be performed by a microprocessor preprogrammed with an inventory of foreground and background engine tasks affecting the efficiency and performance of the vehicle, the method comprising:

sensing the speed of rotation of the crankshaft to provide a first, second, or third signal indicative of respective low, medium, or high crankshaft speeds;

sensing the position of the crankshaft to provide a fourth signal of the crankshaft position; and processing the signals to select:

(a) foreground tasks for execution, if the fourth signal is received to indicate the crankshaft is at a predetermined position;

(b) a first set of such foreground tasks for execution in a first manner, if the first signal is received to indicate a low crankshaft speed;

(c) a second set of such foreground tasks for execution in a second manner, if the second signal is received to indicate a medium crankshaft speed; and (d) a third set of such foreground tasks for execution in a third manner, if the third signal is received to indicate a high crankshaft speed, whereby background engine tasks may be executed by the microprocessor based on the priority for execution such microprocessor accords the selection of first, second or third sets of the foreground tasks.

2. The method of claim 1 wherein the first set of foreground tasks substantially equals the number of foreground tasks.

3. The method of claim 1 wherein the second set of foreground tasks are less than all of the foreground tasks in accordance with the second signal received.

4. The method of claim 1 wherein the third set of foreground tasks are less than all of the foreground tasks in accordance with the third signal received.

5. The method of claim 1 wherein the first manner is a first rate at which the foreground tasks are to be executed at low crankshaft speeds.

6. The method of claim 1 wherein the second manner is a second rate at which the foreground tasks are to be executed at medium crankshaft speeds.

7. The method of claim 1 wherein the third manner is a third rate at which the foreground tasks are to be executed at high crankshaft speeds.

8. The method of claim 1 wherein the engine has a piston and the predetermined position of the crankshaft is indicative of a piston event of the vehicle engine.

9. A system for improving the control quality of a vehicle engine having a rotatable and positionable crankshaft by prioritizing tasks to be performed by a microprocessor preprogrammed with an inventory of foreground and background engine tasks affecting the efficiency and performance of the vehicle, the system comprising:

a first mechanism for selectively sensing the speed of rotation of the crankshaft to provide a first, second, or third signal indicative of respective low, medium, or high crankshaft speeds;

a second mechanism for sensing the position of the crankshaft to provide a fourth signal of the crankshaft position; and a third mechanism for processing these signals to select:

(a) foreground tasks for execution, if the fourth signal is received to indicate the crankshaft is at a predetermined position;

(b) a first set of such foreground tasks for execution in a first manner, if the first signal is received to indicate a low crankshaft speed;

(c) a second set of such foreground tasks for execution in a second manner, if the second signal is received to indicate a medium crankshaft speed; and (d) a third set of such foreground tasks for execution in a third manner, if the third signal is received to indicate a high crankshaft speed, whereby background engine tasks may be executed by the microprocessor based on the priority for execution such microprocessor accords the selection of first, second or third sets of the foreground tasks.

10. The system of claim 9 wherein the first set of the foreground tasks are a predetermined list of tasks.

11. The system of claim 10 wherein the second set of the foreground tasks are a portion of the first set of the foreground tasks.

12. The system of claim 10 wherein the third set of foreground tasks are a portion of the first set of the foreground tasks.

13. The system of claim 9 wherein the first manner is a rate at which the foreground tasks are to be executed at low crankshaft speeds.

14. The system of claim 9 wherein the second manner is a rate at which the foreground tasks are to be executed at medium crankshaft speeds.

15. The system of claim 9 wherein the third manner is a rate at which the foreground tasks are to be executed at high crankshaft speeds.

16. The method of claim 9 wherein the predetermined position is indicative of a piston event of the vehicle engine.

17. A method of prioritizing the operation of a microprocessor in the control of a vehicle's powertrain having parts movable at variable speed and position comprising:

preprogramming the microprocessor for executing a plurality of high priority control tasks and low priority control tasks;

sensing the speed of at least one of the powertrain parts when a powertrain part is at a predetermined position; and selecting less of the high priority tasks for execution by the microprocessor in the control of the vehicle's powertrain, when the speed sensed is low than when the speed is sensed high, whereby to provide for execution of more of the lower priority control tasks when the speed is sensed low.

* * * * *